(12) United States Patent
Hiligsmann et al.

(10) Patent No.: US 6,522,131 B1
(45) Date of Patent: Feb. 18, 2003

(54) MULTI-MODE HALL EFFECT SENSOR FOR DETERMINING POSITION AND TIMING PARAMETERS OF A GEAR WHEEL

(75) Inventors: Vincent Hiligsmann, Chenee (BE); Rudi De Winter, Heusden-Zolder (BE)

(73) Assignee: Melexis NV, Leper (BE)

( * ) Notice: Subject to any disclaimer, the term of this patent is extended or adjusted under 35 U.S.C. 154(b) by 16 days.

(21) Appl. No.: 09/662,992

(22) Filed: Sep. 15, 2000

Related U.S. Application Data

(60) Provisional application No. 60/154,432, filed on Sep. 17, 1999.

(51) Int. Cl.[7] .............................. G01B 7/14; G01B 7/30; G01D 5/14; G01P 3/44
(52) U.S. Cl. .............................. 324/207.2; 324/207.25; 324/207.12; 324/251; 324/174
(58) Field of Search ................... 324/207.12, 207.2, 324/207.25, 207.26, 173, 174, 166, 225, 251, 175; 338/324, 32 R; 340/670–672; 123/406.58, 406.59

(56) References Cited

U.S. PATENT DOCUMENTS

| | | | |
|---|---|---|---|
| 4,761,569 A | 8/1988 | Higgs | 307/309 |
| 5,541,506 A | 7/1996 | Kawakita et al. | 324/207.2 |
| 5,612,618 A | 3/1997 | Arakawa | 324/207.25 |
| 5,619,137 A | 4/1997 | Vig et al. | 324/251 |
| 5,621,319 A | 4/1997 | Bilotti et al. | 324/251 |
| 5,657,189 A | 8/1997 | Sandhu | 360/112 |
| 5,694,038 A | 12/1997 | Moody et al. | 324/207.2 |
| 5,844,411 A * | 12/1998 | Vogt | 324/537 |
| 6,064,199 A | 5/2000 | Walter et al. | 324/207.2 |
| 6,091,239 A | 7/2000 | Vig et al. | 324/207.2 |
| 6,100,680 A * | 8/2000 | Vig et al. | 324/207.2 |
| 6,265,864 B1 * | 7/2001 | De Winter et al. | 324/207.2 |
| 6,356,741 B1 | 3/2002 | Bilotti et al. | 955/90 |

FOREIGN PATENT DOCUMENTS

| | | |
|---|---|---|
| EP | 0 631 416 A2 | 12/1994 |
| EP | 0875733 A | 11/1998 |
| JP | 62048160 | 2/1987 |

OTHER PUBLICATIONS

"3235 Dual–Output Hall–Effect Switch," pp. 4–64 thru 4–67.

"Sensor Signal Conditioning an IC Designer's Perceptive," *Sensors*, pp. 23–30 (Nov. 1991).

Gilbert, J., "Product Description—Technical Advances in Hall–Effect Sensing," *Allegro MicroSystems, Inc.*, pp. 1–8 (May 10, 2000).

* cited by examiner

Primary Examiner—Edward Lefkowitz
Assistant Examiner—Reena Aurora
(74) Attorney, Agent, or Firm—Townsend and Townsend and Crew LLP; Gerald T. Gray

(57) ABSTRACT

A sensor system including magnetic sensing elements and circuitry configured to detect the presence or absence of an article, such as a gear tooth, in a first mode, and to determine timing accuracy in a second mode. Control circuitry is provided for controlling the switching circuitry to switch between modes in a predetermined manner and at predetermined times dependent upon the voltages and magnetic fields. The magnetic sensing elements as well as the switching circuitry, interface circuitry and the control circuitry are preferably integrated onto a single silicon chip to yield an efficient and reliable sensor system. Upon power on, the sensor is configured in the first mode to determine the presence or absence of the article next to the sensor. After a number of transitions of the hall voltage, e.g., indicating a predetermined number of gear teeth have passed the sensor, the sensor is switched to the second mode, and the sensor operates in a dynamic time continuous manner to determine speed and timing parameters.

19 Claims, 13 Drawing Sheets

MULTI-MODE HALL EFFECT SENSOR FOR DETERMINING POSITION AND TIMING PARAMETERS OF A GEAR WHEEL

CROSS REFERENCES TO RELATED APPLICATIONS

This application is related to U.S. Provisional Patent Application Ser. No. 60/154,432 filed Sep. 17, 1999, entitled "MULTI-MODE HALL-EFFECT SENSOR," the disclosure of which is hereby incorporated by reference in its entirety.

BACKGROUND OF THE INVENTION

A hall effect sensor can be configured with a biasing magnet and used to detect the presence or absence of a tooth on a gear wheel. Such sensors are often used to determine the position of the CAM and crankshafts in a modem gasoline or diesel internal combustion engine. The performance requirements demanded of such a sensor in automotive applications are dictated by the timing accuracy and repeatability needed to ensure that the emissions generated by the engine meet the legislated requirements.

A further requirement for automotive applications is that of determining the position of the gear wheel, tooth or gap, almost instantaneously upon power on, known as True Power On (TPO). Such a requirement demands measurement accuracy sufficient to differentiate tooth from gap without any opportunity for the system to learn anything about the circumstances under which it is operating.

To achieve the accuracy necessary for the TPO determination demands special techniques. One such technique uses chopper amplifiers, which introduce phase delays incompatible with the demands of timing necessary to achieve the mechanical positional accuracy demanded. Current real time techniques lack the accuracy required for TPO determinations.

Accordingly it is desirable to provide a sensor arrangement that meets the demands of TPO determinations, mechanical positional accuracy and repeatability.

SUMMARY OF THE INVENTION

The present invention provides a novel sensor system including a switching arrangement that meets the needs of TPO determinations, mechanical positional accuracy and repeatability and also compensates for temperature and long term drift. The switching arrangement according to the present invention configures the elements of a hall effect sensor for operation in various modes. A first mode is optimized for determining the presence or absence of a gear tooth at start up and a second mode is optimized for timing accuracy. Additional circuitry is provided for measuring, computing and storing values for error signals and thresholds.

The sensor system of the present invention includes magnetic sensing elements and circuitry configured to detect the presence or absence of an article, such as a gear tooth, in a first mode, and to determine timing accuracy in a second mode. Control circuitry is provided for controlling the switching circuitry to switch between modes in a predetermined manner and at predetermined times dependent upon the voltages and magnetic fields. The magnetic sensing elements as well as the switching circuitry, interface circuitry and the control circuitry are preferably integrated onto a single silicon chip to yield an efficient and reliable sensor system. Upon power on, the sensor is configured in the first mode to determine the presence or absence of the article next to the sensor. After a number of transitions of the hall voltage, e.g., indicating a predetermined number of gear teeth have passed the sensor, the sensor is switched to the second mode, and the sensor operates in a dynamic time continuous manner to determine speed and timing parameters.

According to the present invention, a sensor system is provided which typically includes a hall plate and first switching circuitry for connecting supply and measurement nodes to pairs of diagonally opposite nodes of the hall plate. The sensor also typically includes a chopper amplifier whose input is connected to the measurement nodes, a clock system for controlling the timing of the switching circuitry and the timing of the chopper amplifier, and a comparator that determines the level of the chopper amplifier output relative to a reference voltage and sets a digital output to a first level when the value of the output voltage is greater than a first threshold value and to a second level when the output voltage is less than a second threshold value. Additionally, the sensor elements of the present invention typically interoperate such that the hall plate is used in a switched arrangement synchronized with the chopper amplifier, the hall voltages from the two orthogonal measurements are averaged to produce the chopper amplifier output, and the hall voltages from the two orthogonal measurements are subtracted one from the other to determine a value for the error signal.

The sensor also typically includes switching circuitry that selectively connects and disconnects the components in a number of configurations, and control circuitry that configures the sensor in a first mode when the power is first applied to the sensor, and to a second dynamic mode after an initial measurement is made in the first mode. After a predefined period, the control circuitry switches the sensor to a second mode wherein the hall plate is held in a steady condition. In the second mode, the hall plate is driven across one pair of opposite connections, the measurement points connected to the other pair of opposite connections, and the hall plate measurement points are connected to a steady state amplifier whose output is connected to a comparator circuit. The comparator circuit thresholds are derived from a calculation of the maximum and minimum hall voltages averaged over a time period added to the determined value of the error signal in such a manner as to counter the effects of the error signal on the accuracy of the timing of the switching of the comparator relative to the mechanical movement of the sensed article.

According to an aspect of the invention, a magnetic sensor system is provided that typically comprises a hall plate having two pairs of connection nodes, a power supply for providing power to the hall plate, and a switching circuit configured to alternately couple one pair of the connection nodes to the power supply and the other pair of connection nodes to measurement nodes. The system also typically comprises a first amplifier circuit, a second amplifier circuit, and a mode switching circuit coupled to the switching circuit and configured to control the switching circuit to connect the measurement nodes of the first amplifier to the hall plate in a first mode, and to connect the measurement nodes of the second amplifier to the hall plate in a second mode. In operation, in the first mode, the mode switching circuit controls the switching circuit to connect the pairs of connection nodes to the power supply and the measurement nodes of the first amplifier circuit in an alternating manner, and in the second mode, the mode switching circuit controls the switching circuit to connect one of the pairs of connection nodes to the power supply and the other pair to the measurement nodes of the second amplifier circuit.

According to another aspect of the invention, a magnetic sensor system is provided, which typically comprises a magnetic sensing means for detecting magnetic fields, the magnetic sensing means having two pairs of connection nodes, power supply means for providing power to the magnetic sensing means, and switching means for alternately coupling one pair of the connection nodes to the power supply and the other pair of connection nodes to measurement nodes. The system also typically includes first and second amplifier circuits that provide first and second voltage signals, respectively, a first comparator means for comparing the first voltage signal received from the first amplifier circuit with a first reference voltage, and a second comparator means for comparing the second voltage signal received from the second amplifier circuit with a second reference voltage and a third reference voltage. The system also typically includes a mode switching means, coupled to the switching means, for controlling the switching means to connect the measurement nodes of the first amplifier to the magnetic sensing means in a first mode, and to connect the measurement nodes of the second amplifier to the magnetic sensing means in a second mode. In operation, in the first mode, the mode switching means controls the switching means to connect the pairs of connection nodes to the power supply means and the measurement nodes of the first amplifier circuit in an alternating manner, wherein the first comparator means provides a first signal if the first voltage signal is above a first threshold value and a second signal if the first voltage signal is below the first threshold value. In the second mode, the mode switching means controls the switching means to connect one of the pairs of connection nodes to the power supply and the other pair to the measurement nodes of the second amplifier circuit in a steady state, wherein the second comparator means provides a third signal if the second voltage signal exceeds a second threshold value and a fourth signal if the second voltage signal falls below a third threshold value.

According to yet another aspect of the present invention, a method is provided for determining position and timing parameters of gear teeth on a gear wheel using an integrated sensor device located proximal the gear wheel. The method typically comprises the steps of detecting the presence or absence of a gear tooth proximal the device in a first mode of operation, and thereafter determining timing parameters of the gear wheel in a second mode of operation. The step of detecting typically includes connecting, in an alternating manner, measurement nodes of a first amplifier to one pair of connection nodes of a hall plate and the other pair of connection nodes to a power supply using a switching circuit so as to produce a first voltage signal, providing the first voltage signal from the first amplifier to a first comparator, comparing, using the first comparator, the first voltage signal with a first reference voltage, and providing an indication signal from the first comparator, wherein the indication signal is set to one of a first value if the first voltage signal is greater than the reference voltage and a second value if the first voltage signal is less than the reference voltage. The step of determining timing parameters typically includes connecting, in a continuous manner, measurement nodes of a second amplifier to one pair of connection nodes and the other pair of connection nodes to the power supply using the switching circuit so as to produce a second voltage signal, providing the second voltage signal from the second amplifier to a second comparator, comparing, using the second comparator, the second voltage signal with second and third reference voltages, and providing a second indication signal from the second comparator, wherein the second indication signal is set to one of a first value if the second voltage signal rises above the second reference voltage and a second value if the second voltage signal falls below the third reference voltage.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

The present invention provides in one embodiment a sensor arrangement including magnetic sensing elements and circuitry configured to detect the presence or absence of an article, such as a gear tooth, in a first mode, and to determine timing accuracy in a second mode. The sensor system also includes switching circuitry to connect the sensor circuitry elements into the configurations required for the first and second modes. In an exemplary embodiment, the sensor system includes a quadrature switched hall plate arrangement that is sensitive to magnetic fields. Control circuitry is provided for controlling the switching circuitry to switch between modes in a predetermined manner and at predetermined times dependent upon the induced voltages and detected magnetic fields. The magnetic sensing elements as well as the switching circuitry, interface circuitry and the control circuitry are preferably integrated onto a single silicon chip to yield an efficient and reliable sensor system.

The operation of the sensor system will now be described. Upon power on, the sensor is configured in a first mode, which, as described below, is useful for determining the presence or absence of an article, such as a gear tooth, next to the sensor. After a number of transitions of the hall voltage, e.g., indicating a predetermined number of gear teeth have passed the sensor, the sensor is switched to a second mode, and, as described below, the sensor operates in a dynamic time continuous manner to determine speed and timing parameters. In this mode, the sensor uses comparator threshold values computed from the maximum and minimum values of the hall voltage, an error voltage stored in the first mode and an hysteresis voltage stored in memory.

Figure 1B:
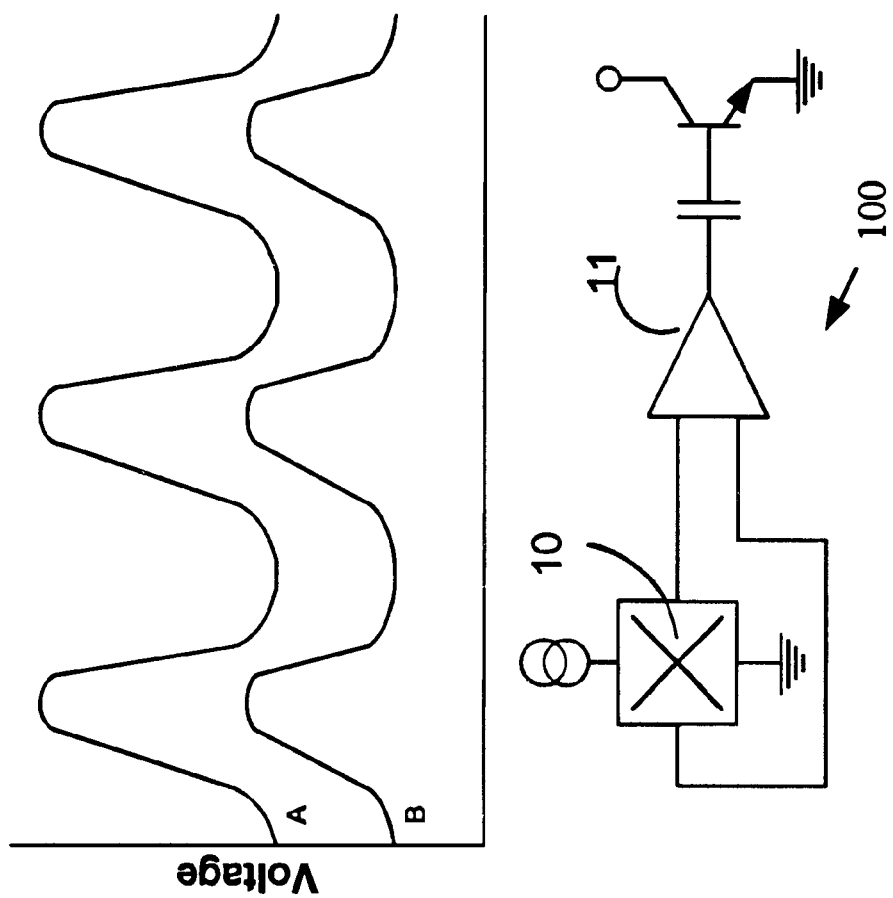
FIG. 1b illustrates an exemplary sensor system as well as a voltage versus time graph of the output of the sensor system when positioned proximal rotating gear wheel at either of two positions according to an embodiment of the present invention.
Figure 1A:
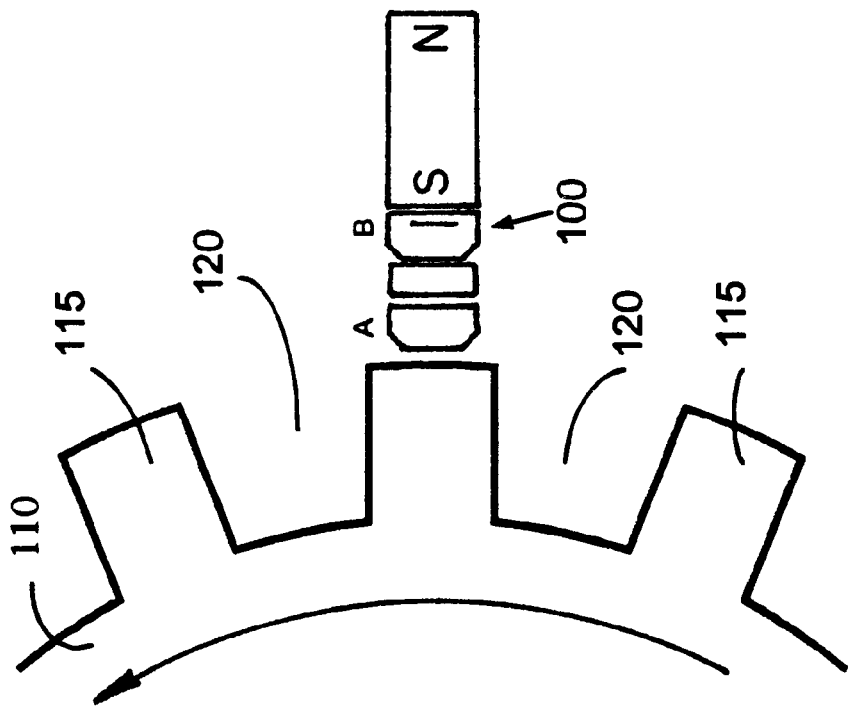
FIG. 1a illustrates an exemplary sensor system positioned proximal a gear wheel according to an embodiment of the present invention.

FIG. 1a illustrates an exemplary sensor system 100 positioned proximal a gear wheel 110 according to an embodiment of the present invention. As shown, gear wheel 110 includes a plurality of equally spaced gear teeth 115. Gaps 120 define the spacing interval of gear teeth 115. FIG. 1b illustrates an exemplary sensor 100 and a voltage versus time graph of the output of sensor 100 when positioned proximal rotating gear wheel 110 at either position A or B as shown in FIG. 1a, according to an embodiment of the present invention. Sensor 100 includes a hall plate 10 and an amplifier arrangement 11 as will be discussed in more detail below. As seen in the Graph of FIG. 1b, when positioned closer to gear wheel 110 (e.g., position A), the minimum and maximum output values of sensor 100 are typically greater than when positioned further away (e.g., position B). Additionally, the periodicity and spacings of the output of sensor 100 shown in the Graph are a function of the speed at which gear wheel 110 rotates as well as the width of teeth 115 and gaps 120.

Figure 2:
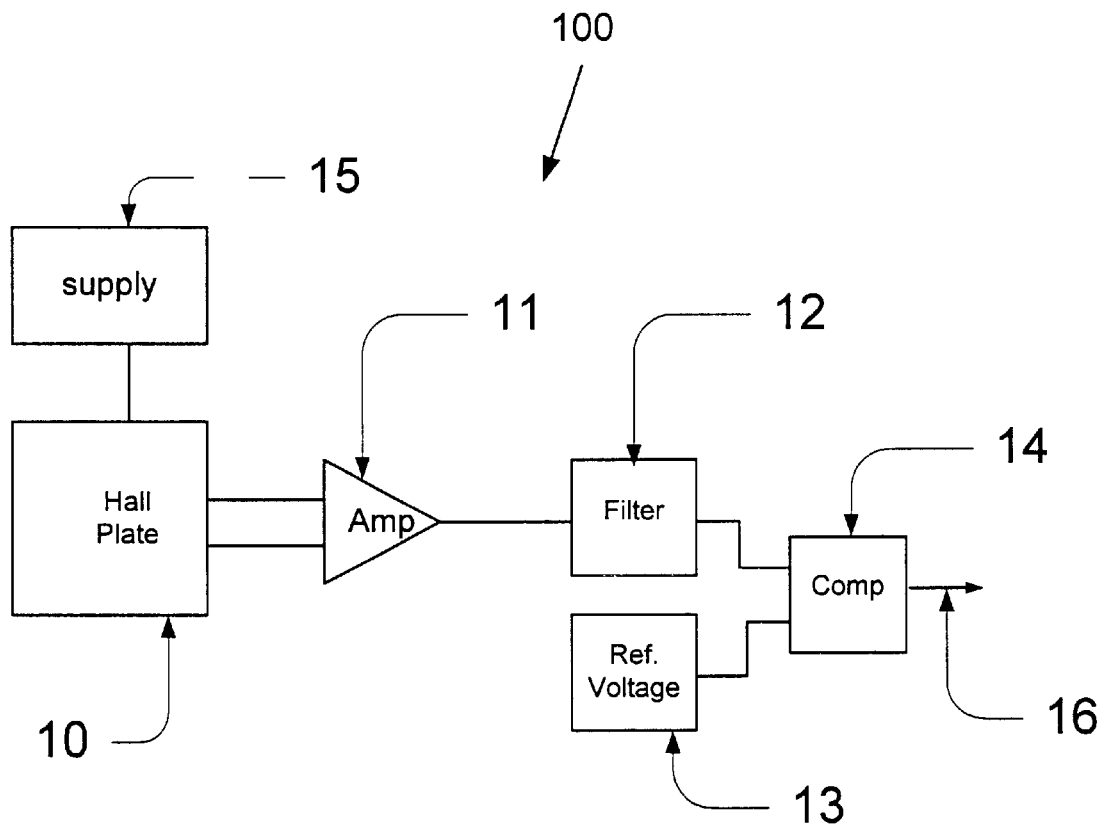
FIG. 2 shows an arrangement of elements of a sensor system configured for a first mode of operation according to an embodiment of the present invention.
Figure 3:
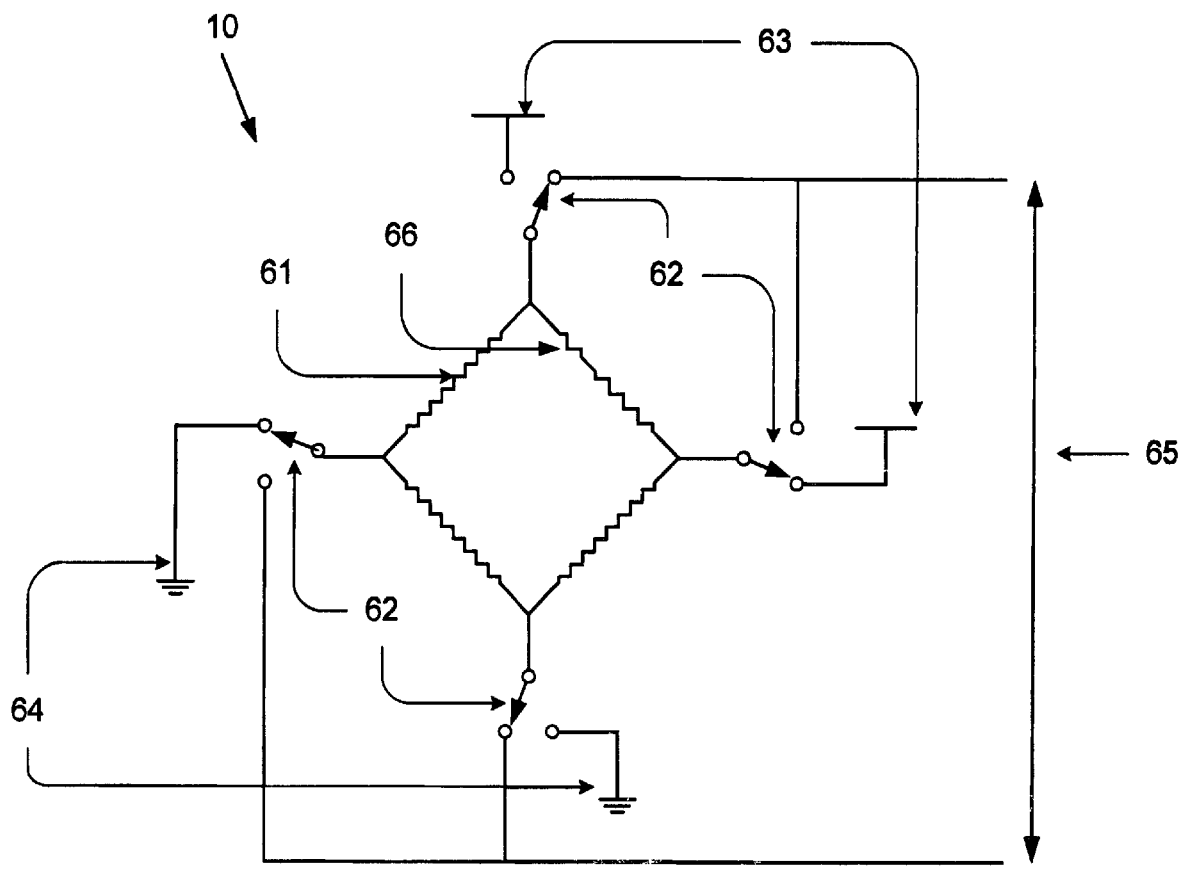
FIG. 3 illustrates a quadrature switching arrangement for the hall plate according to an embodiment of the present invention.

FIG. 2 shows an arrangement of elements of a sensor system 100 configured for a first mode of operation according to an embodiment of the present invention. As shown, sensor system 100 includes a hall plate arrangement 10 coupled to amplifier arrangement 11 and power supply 15. According to an embodiment of the present invention, hall plate arrangement 10 is configured to be connected alternately using the two pairs of diagonally opposed connections. Such an arrangement is well known and allows for the determination of the actual hall voltage with the error voltage significantly reduced or eliminated by the combination of the two hall voltages derived from the alternate switch configurations. FIG. 3 illustrates a quadrature switching arrangement of hall plate 10 according to an embodiment of the present invention. As shown, four switches 62 are configured to connect the hall plate connections 61 in either of two circuit configurations by switching the supply 63 and ground 64 and the output 65 alternately to the two opposite pairs of connections of the hall array. Also shown is an additional element 66 that represents error voltages that can occur in manufacture and assembly of the hall effect device.

Figure 4A:
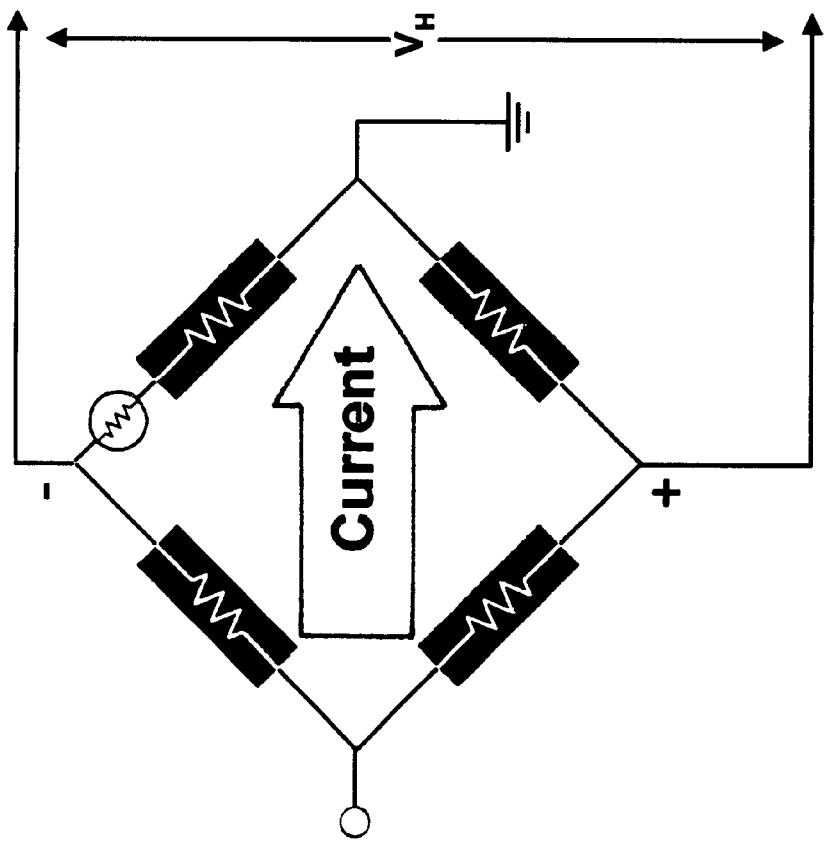
FIGS. 4a and 4b illustrate two configurations of the hall plate of FIG. 3 according to an embodiment of the present invention.
Figure 4B:
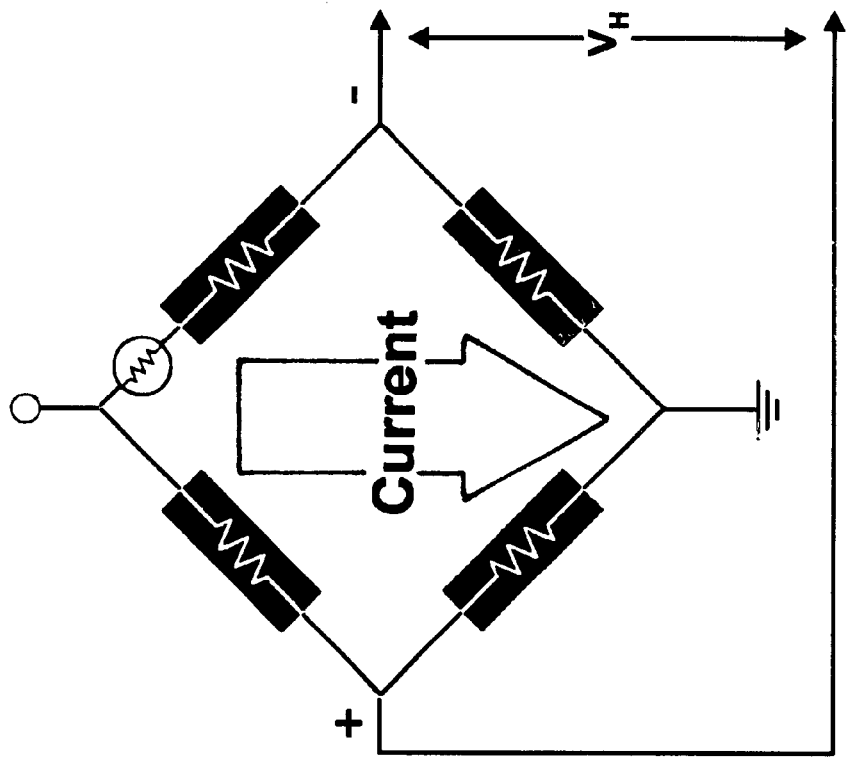

With the four switches 62 configured as shown (first configuration), the output 65 is given by $+V_{HALL}+V_{ERROR}$, where $V_{HALL}$ is the voltage generated by the hall effect as a function of the applied magnetic field and $V_{ERROR}$ is the voltage representing the sum of all errors and unwanted signals generated as a function of the defects in the manufacture of the device. When all four switches 62 are configured in an opposite state (second configuration) the output 65 is given by $-V_{HALL}+V_{ERROR}$. The difference between these two output voltages is approximately $2 \times V_{HALL}$ with the $V_{ERROR}$ effectively eliminated or significantly reduced in magnitude. FIGS. 4a and 4b illustrate an example of hall plate 10 configured in the first and second configurations, respectively, according to an embodiment of the present invention.

Figure 5:
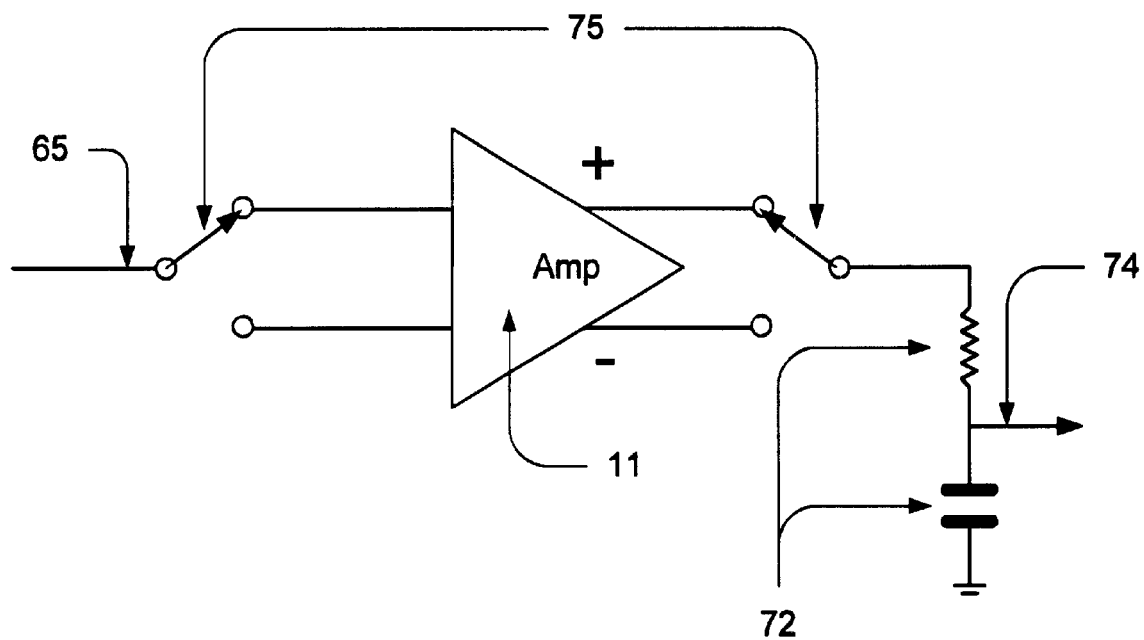
FIG. 5 illustrates a chopper amplifier arrangement according to an embodiment of the present invention.

Referring back to FIG. 2, in a first mode of operation, hall plate 10 is switched synchronously with amplifier arrangement 11. In one embodiment, amplifier arrangement 11 includes a chopper amplifier. In this embodiment, the output of the chopper amplifier is passed to a filter 12 which then drives a comparator 14. The chopper amplifier arrangement 11 uses similar switching techniques to that of the switched hall plate 10. This is shown diagrammatically in FIG. 5, which illustrates a chopper amplifier arrangement 11 according to an embodiment of the present invention. As shown, the input signal 65 from hall plate 10 is applied to the amplifier 11 via a switch arrangement 75. The output is taken from the amplifier via the second half of the switching arrangement 75. Switching arrangement 75 is synchronized to the switching arrangement 62 of hall plate 10 to ensure that when the output 65 of the hall plate 10 is $+V_{HALL}+V_{ERROR}$ (e.g., first configuration), the output 65 is connected to the positive input of the amplifier 11. The output of amplifier 11 is then $+V_{HALL}+V_{ERROR}+V_{OFFSET}$. $V_{OFFSET}$ is the error signal caused by any offset in the amplifier arrangement. When the output 65 of the hall plate is $-V_{HALL}+V_{ERROR}$ (e.g., second configuration), the output 65 of hall plate 10 is connected to the negative input of the amplifier 11. The corresponding output of amplifier 11 is then $-(-V_{HALL}+V_{ERROR})-V_{OFFSET}$. The averaged output of amplifier 11 is then proportional to $+V_{HALL}$.

Figure 6:
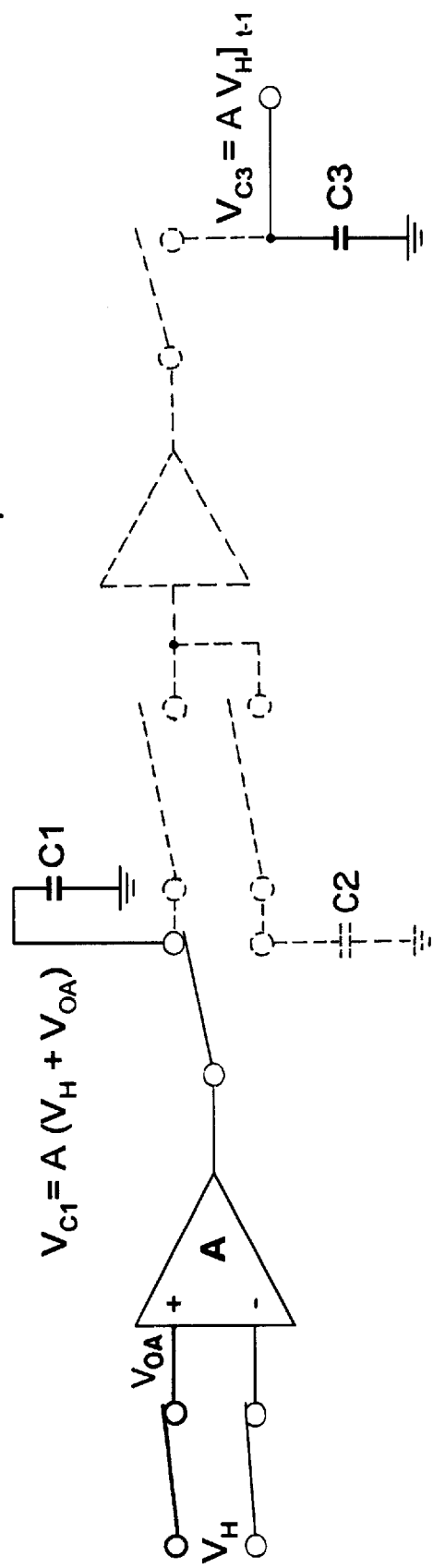
FIGS. 6–9 illustrate various operational phases of an exemplary amplifier arrangement according to an embodiment of the present invention.
Figure 7:
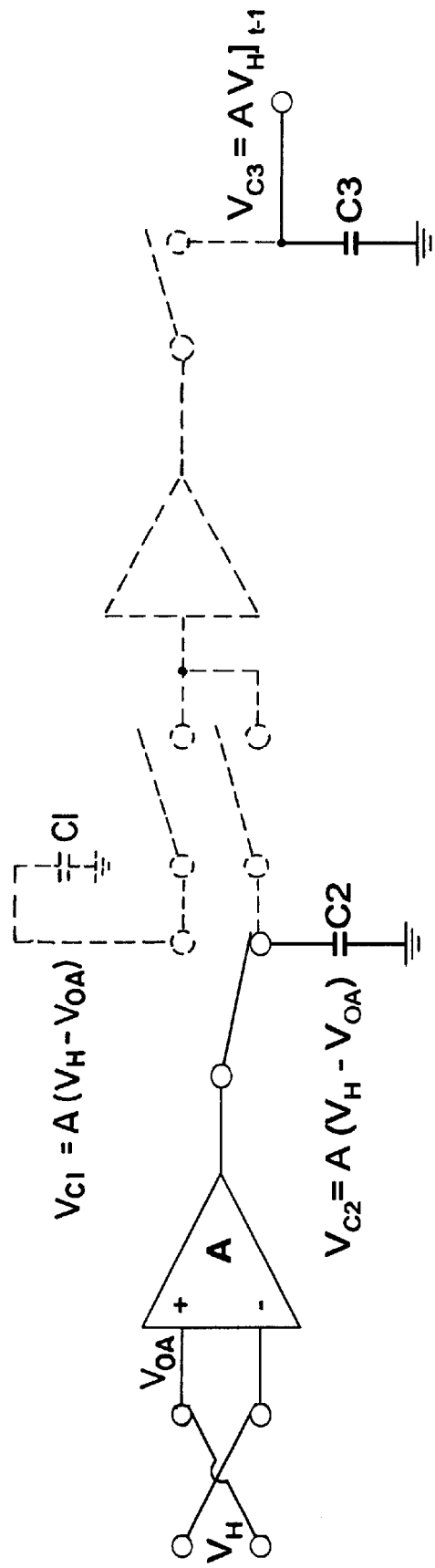
Figure 8:
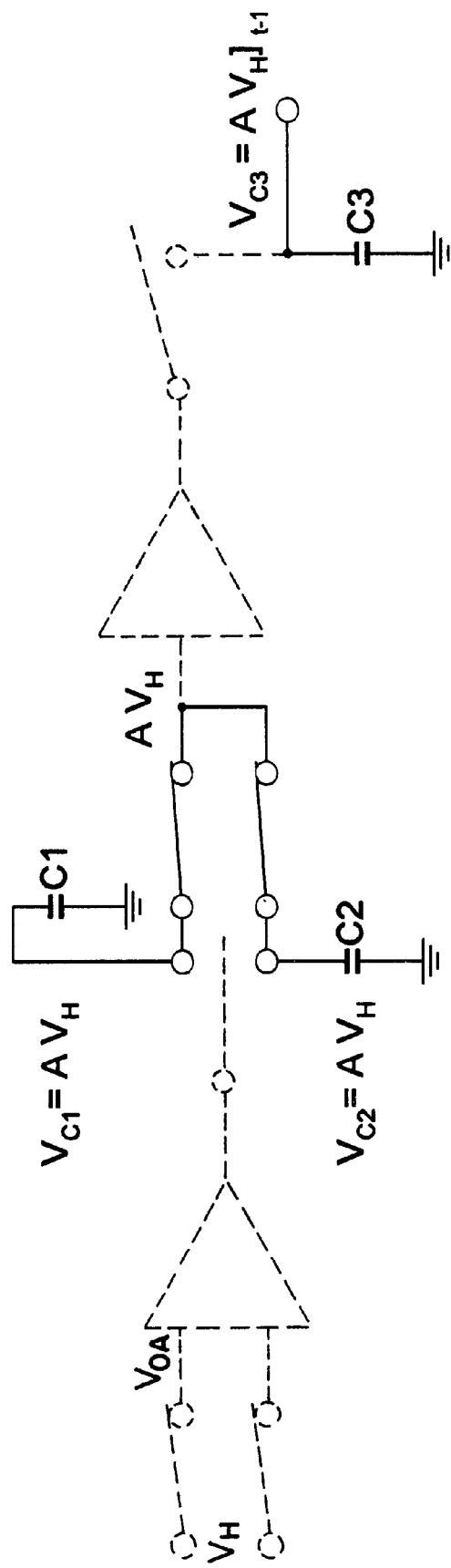
Figure 9:
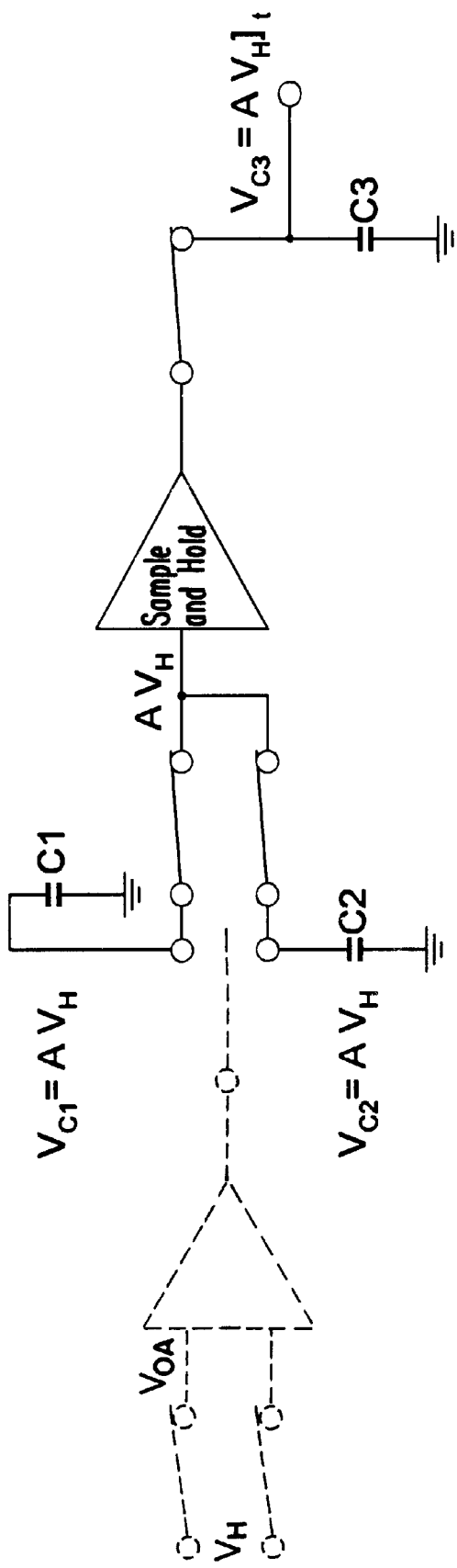

FIGS. 6–9 illustrate various operational phases of an amplifier arrangement 11 using capacitor switching techniques for determining the averaged output of amplifier arrangement 11 according to an embodiment of the present invention. As shown in FIG. 6, in a first phase, e.g., as determined by an applied clock signal, the hall voltage and amplifier offset ($V_{OA}$) are amplified and stored in a first capacitor C1. In the Figures, "A" represents the amplification factor. A third capacitor C3 stores the output voltage from the previous cycle. As shown in FIG. 7, in a second phase, the hall voltage and inverted amplifier offset ($-V_{OA}$) are amplified and stored in a second capacitor C2. As shown in FIG. 8, in a third phase, the voltages stored in the first and second capacitors are combined so as to cancel off the offset voltage and to provide a common voltage proportional to the hall voltage. As shown in FIG. 9, in a fourth phase, the common voltage ($A*V_H$) is loaded into the third capacitor C3.

Referring back to FIG. 2, in the first mode, comparator 14 determines the level of the hall voltage relative to a predetermined reference voltage 13 and sets the output 16 into one of two states via a buffer indicating the presence or absence of a tooth (e.g., T.P.O.).

Figure 10:
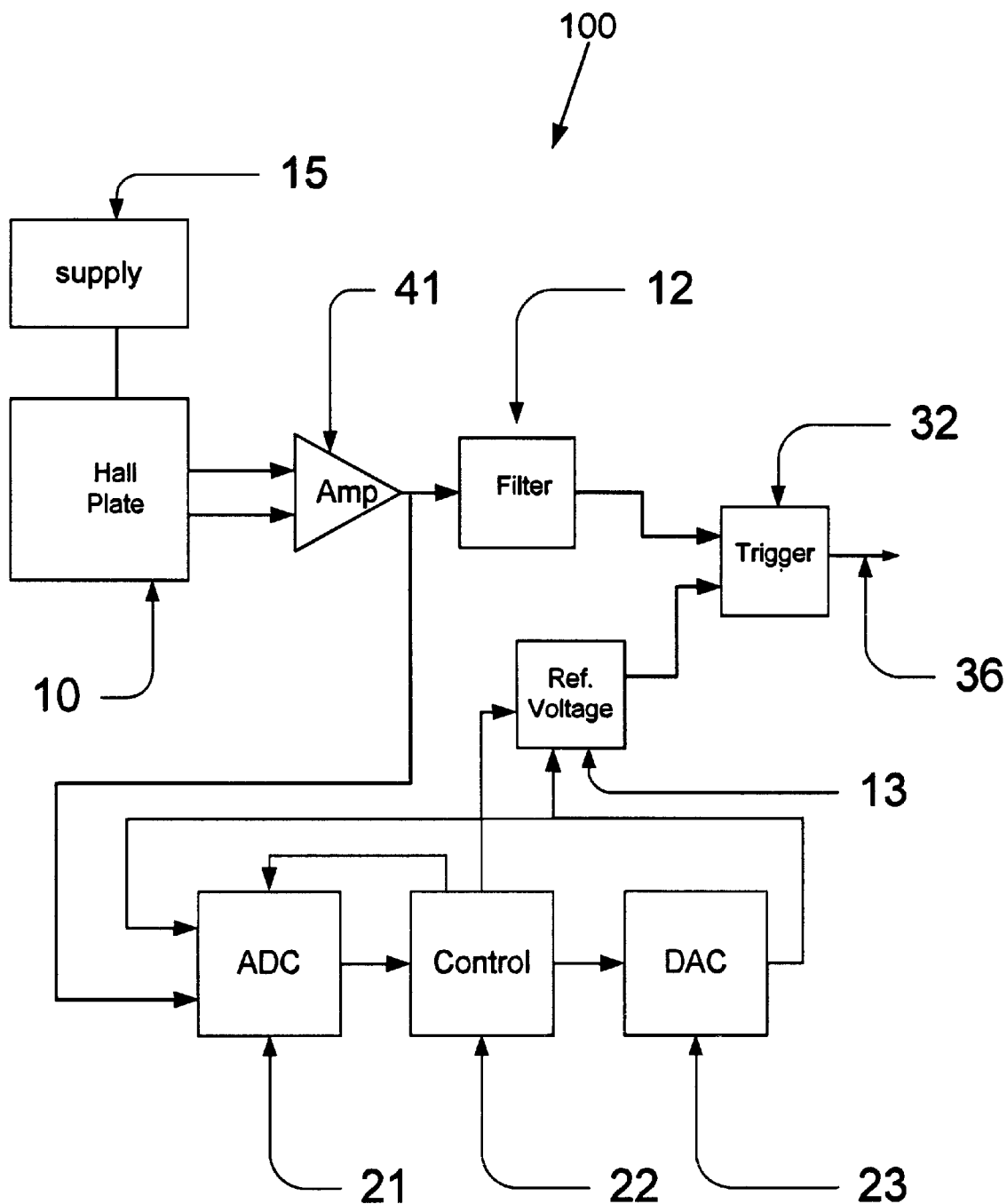
FIG. 10 shows an arrangement of the elements of a sensor configured for a second mode of operation according to an embodiment of the present invention.

Referring to FIG. 10, in a second mode of operation the output 65 of hall plate 10 is switched to a continuous amplifier 41 (e.g., steady state amplifier) and the hall plate 10 stays connected in one of the two connection configurations (e.g., as shown in FIG. 4a or FIG. 4b). The voltage from the continuous amplifier 41 is connected through filter 12 to a comparator 32, which in one embodiment is a trigger circuit. In this embodiment, the output 36 of the trigger circuit 32 is set to a first state when the voltage on its input exceeds a first threshold and is set to a second state when the voltage on the input falls below a second threshold.

In one embodiment, the two threshold values for trigger circuit 32 are determined from the maximum and minimum values of the voltage from the hall plate 10. These maximum and minimum values are stored, averaged and added to the value of the error voltage to determine the thresholds. The two threshold values are separated by a hysteresis value that is either pre-set or determined by the application and programmed into a memory (not shown). FIG. 10 shows circuitry according to an embodiment of the invention that determines the maximum, minimum and average values and to control the overall processing and switching.

Figure 11:
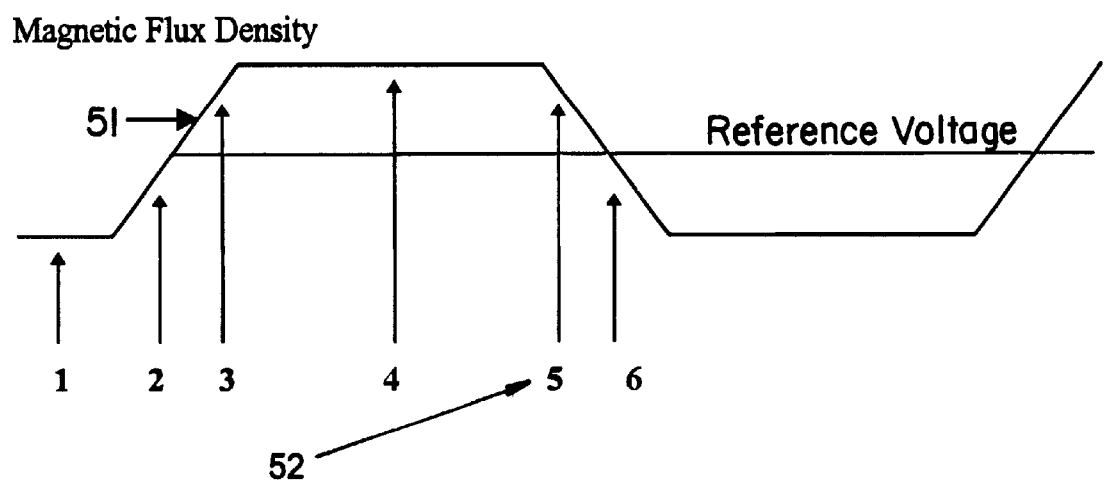
FIG. 11 shows examples of possible starting points for the mechanical arrangement at start up according to an embodiment of the present invention.
Figure 12:
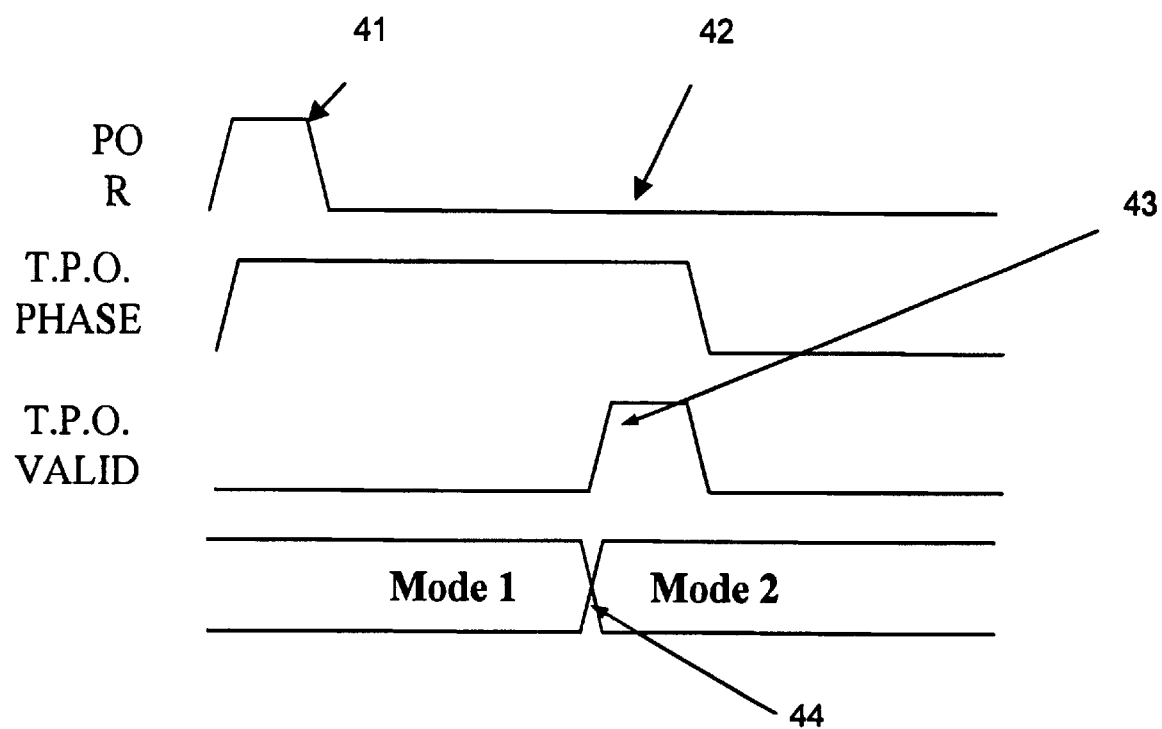
FIG. 12 is a timing diagram for the start up sequence according to an embodiment of the present invention.

FIG. 11 illustrates examples of the operation of aspects of the present invention at possible starting points as follows:

Start Point 1: T.P.O. gives a LOW initial state because the signal is lower than the reference voltage 13. The slope is "zero" (not exactly null due to noise but less than $\epsilon$) then becomes positive. The output toggles at MIN+$\epsilon$ (MIN is equal to the initial value which is, in this case, the true minimal signal) and the system looks for the next MAX. Once found, the output toggles again at MAX-$\epsilon$. The third transition occurs at MIN+$\epsilon$. A decision is taken according to the aforementioned algorithm.

Start Point 2: T.P.O. gives a LOW initial state. The slope is directly positive. The output toggles at MIN+$\epsilon$ (in this case, MIN is equal to the initial value but may not be the true minimal signal). The system then looks for the next MAX and toggles again and MAX-$\aleph$. The third transition occurs at MIN+$\aleph$. A decision is taken according to the aforementioned algorithm.

Start Point 3: T.P.O. gives a HIGH initial state. The slope is first positive, becomes zero and then negative. In any case, the output toggles at MAX-$\epsilon$ (in this case, MAX is the true maximal value). The next MIN is detected and the output toggles at MIN+$\aleph$. The third transition occusr at MAX-$\aleph$. A decision is taken according to the aforementioned algorithm.

Start Point 4: T.P.O. gives a HIGH initial state. The slope is first zero and becomes negative. The output toggles at MAX-$\epsilon$ (in this case, MAX is the initial value which is also the true maximal value). The next MIN is detected and the output toggles at MIN+$\aleph$. The third transition occurs at MAX-$\aleph$. A decision is taken according to the aforementioned algorithm.

Start Point 5: T.P.O. gives a HIGH initial state and the slope is negative. The output toggles at MAX-$\epsilon$ (in this case, MAX is the initial value and is lower than the true maximal value). The next MIN is detected and the output toggles at MIN+$\aleph$. The third transition occurs at MAX-$\aleph$. A decision is taken according to the aforementioned algorithm.

Start Point 6: T.P.O. gives a LOW initial state. The slope is first negative, becomes zero and then positive. In any case, the output toggles at MIN+$\epsilon$ (in this case, MIX is the true minimal value). The next MAX is detected and the output toggles at MAX-$\aleph$. The third transition occurs at MIN+$\aleph$. A decision is taken according to the aforementioned algorithm.

In one embodiment of the invention, predetermined reference voltages are generated from a digital to analog converter (DAC) 23 using digital values stored in a memory (not shown) such as a non-volatile memory. These digital values may be programmed into the memory at either the manufacturing or installation operations. In one embodiment, the reference voltage is determined when the hall plate 10 is switched. The two hall voltages generated when the hall plate is switched are additionally summed with one of the voltages inverted such as to cancel the actual hall voltage and determine the value of the error voltage. This error voltage is also stored in the memory.

In one embodiment, additional memories are integrated in the sensor system to enable adjustment or pre-configuration of additional parameters such as the drive current level for the hall plate 10 and offset voltages used in the amplifier arrangement 11. For example, a memory coupled to supply 15 enables adjustment or pre-configuration of the drive current level for hall plate 10, and a memory coupled to amplifier arrangement 11 enables the application of offset voltages.

In a third mode of operation the circuitry is configured to enable the reading of internal voltages and stored values, and the programming of internal non-volatile memory via either the normally available connections to the integrated circuit or dedicated additional connections or some combination of existing and additional connections. In one embodiment, this third mode is available only at test or at installation if security or integrity of the stored data demands. Alternately, this third mode can be permanently disabled after programming by a final action of programming a 'suicide bit' which, once programmed disables the programming function.

In one embodiment, the amplifier arrangement 11 remains connected to the hall voltage outputs during the second mode of operation. During a predetermined or random time period when the hall voltage is not expected to change, the hall plate 10 is switched to its other connection arrangement and an updated value for the error voltage is determined from the last reading in the first connection arrangement and the first reading in the second connection arrangement. Switching and measuring in this manner allows for the error voltage to be updated. The updated error voltage is used to compensate for changes in the error voltage from the hall plate caused by temperature changes or other stresses.

Figure 13:
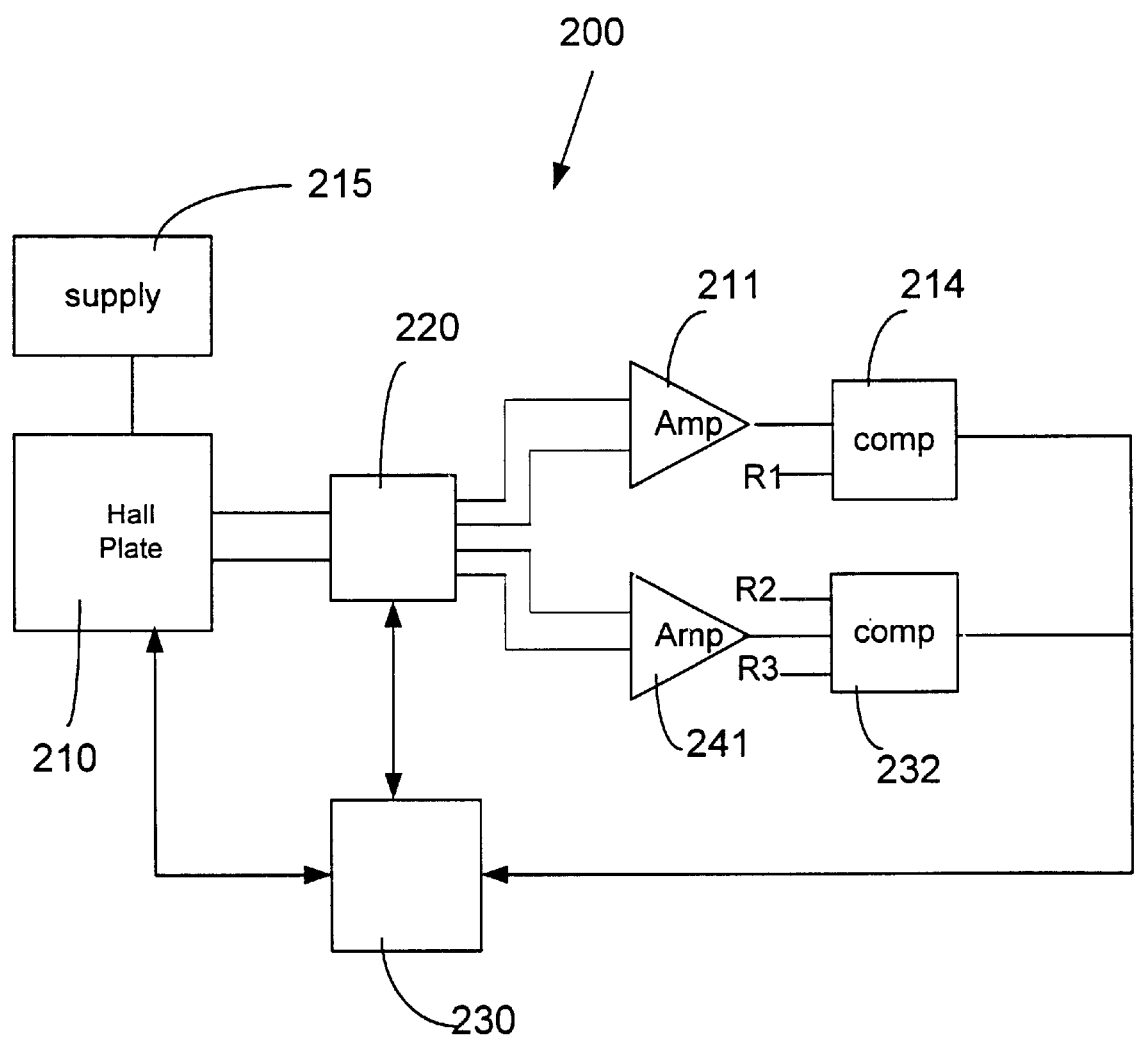
FIG. 13 illustrates a sensor system including a switching circuit according to an embodiment of the present invention.

The sensor system 100 in one embodiment includes timing and logic circuit arrangements configured to switch the hall plate between the modes of operation and to re-calculate the error voltage at suitable times. These times may depend on a function of the stored history of the hall waveforms and predetermined algorithms based on the expected application conditions. FIG. 13 illustrates a sensor system 200 including a switching circuit 220 according to an embodiment of the present invention. As shown, sensor system 200 includes hall plate 210, switching circuit 220, chopper amplifier 211 and continuous amplifier 241. In preferred aspects, the timing and logic for controlling the sensor system is implemented in a microcontroller 230, which provides overall control for sensor system 200. In operation, microcontroller 230 provides mode control signals to switching circuit 220 to switch output connection nodes of hall plate 210 to chopper amplifier 211 or continuous amplifier 241. For example, in one embodiment, the switching circuitry of hall plate 210 alternates connection configurations at the desired clock frequency (e.g., first mode) in response to a first mode control signal, and maintains one connection configuration (e.g., second mode) in response to a second mode control signal. Additionally, switching circuit 220 connects the output 265 of hall plate 210 to chopper amplifier 211 and continuous amplifier 241 in response to the first and second mode control signals, respectively.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A magnetic sensor system, comprising:
   a hall plate having two pairs of connection nodes;
   a power supply for providing power to the hall plate;
   a switching circuit configured to alternately couple one pair of the connection nodes to the power supply and the other pair of connection nodes to measurement nodes;
   a first amplifier circuit;
   a second amplifier circuit;
   a mode switching circuit coupled to the switching circuit and configured to control the switching circuit to connect the measurement nodes of the first amplifier to the hall plate in a first mode, and to connect the measurement nodes of the second amplifier to the hall plate in a second mode;
   wherein in the first mode, the mode switching circuit controls the switching circuit to connect the pairs of connection nodes to the power supply and the measurement nodes of the first amplifier circuit in an alternating manner;
   and wherein in the second mode, the mode switching circuit controls the switching circuit to connect one of the pairs of connection nodes to the power supply and the other pair to the measurement nodes of the second amplifier circuit.

2. The magnetic sensor system of claim 1, wherein all components are fabricated onto a silicon substrate.

3. The magnetic sensor system of claim 1, further including:
   a first comparator circuit configured to receive a first voltage signal from the first amplifier circuit; and
   a second comparator circuit configured to receive a second voltage signal from the second amplifier circuit;
   wherein in the first mode the first comparator receives the first voltage signal from the first amplifier and provides one of a first signal if the first voltage signal is above a first threshold value and a second signal if the first voltage signal is below the first threshold value; and wherein in the second mode the second comparator receives the second voltage signal from the second amplifier and provides one of a third signal if the second voltage signal exceeds a second threshold value and a fourth signal if the second voltage signal falls below a third threshold value.

4. The magnetic sensor system of claim 3, wherein the first amplifier circuit includes a chopper amplifier and a second switching circuit, the second switching circuit being configured to alternately couple the measurement nodes to first and second inputs of the chopper amplifier synchronous with the operation of the first switching circuit.

5. The magnetic sensor system of claim 4, wherein the first amplifier circuit further includes a switched capacitor arrangement coupled to an output of the chopper amplifier and configured to provide the first voltage signal such that the first voltage signal is proportional to an average hall voltage of two alternate connection configurations of the first switching circuit.

6. The magnetic sensor system of claim 5, further including a clock circuit for providing a clock signal to the first and second switching circuits and to the switched capacitor arrangement.

7. The magnetic sensor system of claim 3, wherein the second amplifier circuit includes a continuous amplifier.

8. The magnetic sensor system of claim 3, wherein in the first mode of operation the first voltage signal has a minimum value and a maximum value, and wherein the second and third threshold values are determined using the minimum and maximum values of the first voltage signal from the first mode of operation.

9. The magnetic sensor system of claim 3, wherein the hall plate is positioned proximal a rotating gear wheel having a plurality of gear teeth, wherein when power is first supplied to the hall plate, the mode switching circuit configures the system in the first mode so as to determine the presence or absence of a gear tooth proximal the hall plate, and wherein after a predetermined period, the mode switching circuit configures the system to the second mode so as to determine timing parameters associated with the rotating gear wheel.

10. The magnetic sensor system of claim 1, wherein the mode switching circuit includes a microprocessor that provides a mode switching control signal to the switching circuit.

11. A magnetic sensor system, comprising:
   a magnetic sensing means for detecting magnetic fields, the magnetic sensing means having two pairs of connection nodes;
   power supply means for providing power to the magnetic sensing means;
   switching means for alternately coupling one pair of the connection nodes to the power supply and the other pair of connection nodes to measurement nodes;
   a first amplifier circuit that provides a first voltage signal;
   a first comparator means for comparing the first voltage signal received from the first amplifier circuit with a first reference voltage;
   a second amplifier circuit that provides a second voltage signal;
   a second comparator means for comparing the second voltage signal received from the second amplifier circuit with a second reference voltage and a third reference voltage;
   mode switching means, coupled to the switching means, for controlling the switching means to connect the measurement nodes of the first amplifier to the magnetic sensing means in a first mode, and to connect the measurement nodes of the second amplifier to the magnetic sensing means in a second mode;
   wherein in the first mode, the mode switching means controls the switching means to connect the pairs of connection nodes to the power supply means and the measurement nodes of the first amplifier circuit in an alternating manner, wherein the first comparator means provides a first signal if the first voltage signal is above a first threshold value and a second signal if the first voltage signal is below the first threshold value;
   and wherein in the second mode, the mode switching means controls the switching means to connect one of the pairs of connection nodes to the power supply and the other pair to the measurement nodes of the second amplifier circuit in a steady state, wherein the second comparator means provides a third signal if the second voltage signal exceeds a second threshold value and a fourth signal if the second voltage signal falls below a third threshold value.

12. The magnetic sensor system of claim 11, wherein all components are fabricated onto a silicon substrate.

13. The magnetic sensor system of claim 11, wherein the mode switching means includes a microprocessor that provides a mode switching control signal to the switching means.

14. The magnetic sensor system of claim 11, wherein the magnetic sensing means includes a hall plate arrangement.

15. A method of determining position and timing parameters of gear teeth on a gear wheel using an integrated sensor device located proximal the gear wheel, the method comprising the steps of:

detecting the presence or absence of a gear tooth proximal the device in a first mode of operation; and thereafter determining timing parameters of the gear wheel in a second mode of operation, wherein the sensor device includes a hall plate that provides a hall voltage and having two pairs of connection nodes, a power supply, a switching circuit, and a first amplifier coupled to a first comparator, wherein the step of detecting includes:

connecting, in an alternating manner, measurement nodes of the first amplifier to one pair of connection nodes and the other pair of connection nodes to the power supply using the switching circuit so as to produce a first voltage signal;

providing the first voltage signal from the first amplifier to the first comparator;

comparing, using the first comparator, the first voltage signal with a first reference voltage; and providing an indication signal from the first comparator, wherein the indication signal is set to one of a first value if the first voltage signal is greater than the reference voltage and a second value if the first voltage signal is less than the reference voltage.

16. The method of claim 15, further comprising the steps of:

determining minimum and maximum values of the hall voltage; and storing the minimum and maximum values in a memory.

17. The method of claim 16, wherein a gear tooth is located proximal the sensor device when the indication signal has the first value, and wherein a gap between the gear teeth is located proximal the sensor device when the indication signal has the second value.

18. The method of claim 15, wherein the sensor device further includes a second amplifier coupled to a second comparator, wherein the step of determining timing parameters includes:

connecting, in a continuous manner, measurement nodes of the second amplifier to one pair of connection nodes and the other pair of connection nodes to the power supply using the switching circuit so as to produce a second voltage signal;

providing the second voltage signal from the second amplifier to the second comparator;

comparing, using the second comparator, the second voltage signal with second and third reference voltages; and providing a second indication signal from the second comparator, wherein the second indication signal is set to one of a first value if the second voltage signal rises above the second reference voltage and a second value if the second voltage signal falls below the third reference voltage.

19. The method of claim 18, further comprising the steps of:

in the first mode of operation, determining minimum and maximum values of the hall voltage;

storing the minimum and maximum values in a memory; and in the second mode of operation, providing the minimum and maximum values to the second comparator, wherein the second comparator uses the maximum value as the second reference signal and the minimum value as the third reference signal.

* * * * *